United States Patent [19]

Galic

[11] Patent Number: 5,049,321

[45] Date of Patent: Sep. 17, 1991

[54] METHOD FOR FORMING COATED PLASTIC OPTICAL ELEMENTS

[75] Inventor: George Galic, Columbia Heights, Minn.

[73] Assignee: Signet Armorlite, Inc., Minneapolis, Minn.

[21] Appl. No.: 461,571

[22] Filed: Jan. 5, 1990

Related U.S. Application Data

[63] Continuation of Ser. No. 173,290, Mar. 25, 1988, abandoned, which is a continuation of Ser. No. 818,729, Jan. 14, 1986, abandoned.

[51] Int. Cl.$^5$ ............................................. B29D 11/00
[52] U.S. Cl. ..................................... 264/1.4; 264/1.7; 522/48; 522/182; 522/902; 523/106
[58] Field of Search .................. 264/1.4, 1.7, 1.8, 1.9; 427/164; 522/48, 902, 182; 523/106, 107; 524/347; 525/937

[56] References Cited

U.S. PATENT DOCUMENTS

| | | | |
|---|---|---|---|
| 4,544,572 | 6/1988 | Sandrig et al. | 427/44 |
| B14,544,572 | 6/1988 | Sandrig et al. | 427/44 |

Primary Examiner—James Lowe
Attorney, Agent, or Firm—Marshall, O'Toole, Gerstein, Murray & Bicknell

[57] ABSTRACT

A method for coating a plastic lens element including applying a coating composition consisting substantially of reactants having at least triacrylate functionality, a photo-initiator and a polymerization inhibitor reactive with oxygen to the face of a mold. The coating is subjected to ultraviolet light in an oxygen containing environment such that a hard abrasion-resistant coating is formed. The mold is then filled with a lens forming composition which is reactive with acrylate groups of the coating at the coating/lens interface. The lens forming composition is permitted to cure in the mold with the lens forming composition being bonded to the lens coating.

26 Claims, No Drawings

METHOD FOR FORMING COATED PLASTIC OPTICAL ELEMENTS

This is a continuation of Ser. No. 07/173,290 filed Mar. 25, 1988 (now abandoned) which was a continuation of Ser. No. 06/818,729 filed Jan. 14, 1986 (now abandoned).

BACKGROUND OF THE INVENTION

1. Field of the Invention

The present invention relates to coated ophthalmic lens and to the method of applying a coating to such a lens, and in particular, it relates to applying a thin layer of a composition containing reactants having a triacrylate functionality.

2. Description of the Prior Art

Optically clear, polymerizable, cast or molded plastics having a high light transmission and low haze are increasingly preferred over glass for ophthalmic lens material due to lighter weight, higher impact resistance and breakage resistance, as well as lower manufacturing costs in high-volume applications. Optical elements and lenses of uncoated plastic, however, suffer by comparison to glass from poor resistance to abrasion, scratching and marring which results in surface haze and poor image quality as well as low resistance to some common chemicals and solvents. Numerous commercial products have been introduced which have a hardcoating to protect the plastic lens.

Conventional methods of applying such hardcoating compositions employ flowcoating, dipping, spraying, spin coating, curtaincoating, and various other methods. All of these methods apply the coating to a previously formed or shaped, molded or cast plastic optical element or lens. However, certain advantages exist for applying the hardcoating composition into the mold before casting or molding takes place, then partially or fully polymerizing the coating with the coating adhering to the molded plastic optical element at the time of removal from the mold. Examples of in-mold coating processes for forming labels on plastic containers are described in the following patents.

| Inventor | Patent No. |
| --- | --- |
| Ross | 4,498,854 |
| Bartimes et al | 4,479,644 |
| Slat et al | 4,479,770 |
| Slat et al | 4,479,771 |

Examples of in-mold processes which provide a decorative or protective coating on nonoptical thermoset molded plastics or plastic parts are described in the following patents:

| Inventor | Patent No. |
| --- | --- |
| Verwer et al | 4,517,235 |
| Ungar et al | 4,520,062 |
| Makhlouf et al | 4,477,405 |
| Modur et al | 4,443,177 |
| Ungar et al | 4,499,235 |
| Monnet | 4,497,763 |
| Griffith et al | 4,438,062 |
| Hamner | 4,515,543 |
| Cobbledick | 4,515,710 |
| Cobbledick et al | 4,508,785 |

Hard coating of polymethyl methacrylate (PMMA) cell-cast acrylic sheet windows is described in Japanese Patent 74-45965 issued on May 2, 1974 to Oshima et al. The coating is applied in-mold and is subjected to a plurality of exposures to actinic or ultraviolet radiation before filling the mold with a suitable polymerizable resin. The coating is cured in situ with the acrylic sheet. One drawback to this process is that the freshly coated mold is blanketed with an inert gas atmosphere before exposing the ultraviolet-curable coating composition to an ultraviolet radiation source.

The Oshima et al U.S. Pat. No. 3,968,305 also describes providing a protective coating layer to acrylic sheet windows. Preferred coating compositions include trimethylolethane triacrylate, trimethylolpropane triacrylate, pentaerythritol tetracrylate. The coating is polymerized preferably by ultraviolet rays with the polymerization carried out in noncontact with oxygen. A photosensitizer is used, capable of activating the polymerizable coating material at a wavelength ranging from 3000 to 4000 A, to produce a radical with a preferred photosensitizer being a carbonyl compound. After the coating composition is placed on the mold surface, a film having little or no affinity for the coating composition is made to adhere closely to the coating composition to ensure that no air bubbles are left therebetween preventing the coating composition from coming into contact with oxygen. After the coating composition is cured to the degree desired, the film is removed and monomer for the formation of the polymeric body of the article is disposed on the coated cured composition. Although the coating material is polymerized to a great degree, there is adhesion of the surface layer to the resin forming the shaped article.

The Matsuo et al U.S. Pat. No. 3,968,309 describes a process for applying an abrasion resistant coating on a substrate of plastic. The coating consists of at least 30% by weight polyfunctional compounds selected from the group consisting of polymethacryloyloxy compounds having at least three methacryloyloxy groups in one molecule with the molecules having a molecular weight of 250 to 800 and polyacryloyloxy compounds having at least 3 acryloyloxy groups in each molecule, and a fluorine-containing surfactant, in which the fluorine atom is bonded to a carbon atom. The coating is either applied to the already molded plastic substrate or is applied to the mold and the coating is cured by ultraviolet radiation in a nitrogen atmosphere.

The Russell U.S. Pat. No. 4,338,269 discloses an in-mold applied hardcoating composition for the formation of a coated ophthalmic lens. The coating composition includes a pentaerythritol-based polyacrylate in combination with a cellulose ester or vinyl chloride-vinyl-acetate-containing copolymer (the function of which is to reduce surface oxygen inhibition during cure) followed by ultraviolet actinic radiation to form a cured abrasion-resistant coating in the presence of an ordinary oxygen-containing atmosphere. However, in order to obtain a satisfactory degree of crosslinking in the presence of ultraviolet radiation in an ordinary oxygen-containing environment, the Russell compositions contain a cellulose ester or a vinyl chloride-vinyl acetate containing copolymer in substantial proportion. Consequently, the Russell coating does not achieve the abrasion resistance that is presently desirable for ophthalmic lenses.

The Sandvig et al U.S. Pat. No. 4,544,572 describes an in-mold hardcoated plastic ophthalmic lens which employs an ethylenically-reactive-unsaturated monomer/oligomer-containing formulation which is applied to a mold surface. Solvents in the formulation are volatilized and the formulation is brought to an intermediate degree of crosslinking by either heat or actinic radiation to form a dry tack-free film having sufficient adhesion and cohesive strength to the mold surface to permit further processing and to precisely replicate the mold surface so as to be free of optical defects. The coating at this point is in a soft-nonabrasion-resistant "gelled" polymer state. The lens forming material is then introduced into the mold and the lens forming material along with the coating composition is then subsequently crosslinked or hardened by heat or UV. The lens is removed with the coating adhering to the fully polymerized plastic lens, both being in a fully cured state.

SUMMARY OF THE INVENTION

The present invention includes an ophthalmic lens having an abrasion resistant coating and method for forming the same. The coating composition consists substantially of reactants having at least triacrylate functionality, a photoinitiator and a polymerization inhibitor reactive with oxygen. The method includes applying an ultraviolet curable liquid coating composition on a first face of a mold. The coating is subjected to ultraviolet radiation from an ultraviolet radiation source in an oxygen containing environment such that the coating composition is cured to a hard/abrasion-resistant state. The mold is then filled with a liquid material to form the ophthalmic lens. The ophthalmic lens material is permitted to harden and react with acrylate groups at the coating/lens interface. After the ophthalmic lens material is cured, the coated lens is removed from the mold with the coating adhering thereto.

DETAILED DESCRIPTION OF THE PREFERRED EMBODIMENTS

The present invention includes a process for producing an ophthalmic lens having an abrasion resistant coating in situ. For purposes of the present application, "abrasion resistant coating" is defined as a coating providing a greater resistance to abrasion than the ophthalmic lens. The coating is applied to a mold surface and cured to an abrasion resistant state in an oxygen environment using ultraviolet radiation. Material to form the lens is then introduced into the mold and cured to a hard state with the coating adhering to the lens material. The molds used to form the coated lens of the present invention are well known in the art. The molds have first and second mold sections that form front and back optical surfaces of the lens. At least one of these mold sections has a surface that forms a finished optical surface.

The coating composition of the present invention is applied to at least one of the mold surfaces by any one of a variety of techniques that includes spraying, dipping, brushing, flowcoating, spin coating and the like. A preferred method of applying the coating is flowcoating.

The coating composition of the present invention primarily consists of reactants having at least a triacrylate functionality. In other words, the composition includes predominately monomers or oligomers having at least three or more acrylate-functional groups per molecule. It has been found that such a composition renders excellent levels of abrasion resistance and surface hardness once cured.

A preferred composition having such triacrylate or polyacrylate functionality includes monomer or oligomer constituents that form pentaerythritol tetraacrylate (PETA), dipentaerythritol monohydroxy pentaacrylate (DPMHPA), trimethylolpropane trimethylacrylate (TMPTA), blends or oligomers thereof, as well as other polyacrylate-functional prepolymers. It is preferred that reactants having triacrylate functionality having a molecular weight of less than 2000 and more preferably a molecular weight of less than 600.

The preferred constituent of the coating composition of the present invention includes PETA, which is commercially supplied under the designation SR-295 by the Sartomer Resin Division of Atlantic Richfield Company. It is believed that PETA has the following general formula:

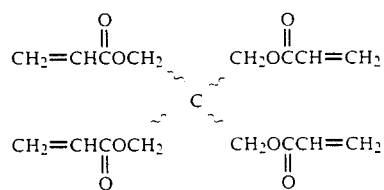

PETA is a waxy solid at room temperature and is diluted with a low viscosity, highly volatile solvent so that the coating may be readily applied to the face of a mold. A preferred solvent is methylene chloride. Other solvents, such as methyl ethyl ketone are also includable within the scope of the present invention.

An important constituent of the coating composition of the present invention is a photoinitiator to provide maximum ultraviolet-initiated crosslinking reaction. A photoinitiator for purposes of the present invention is defined as a compound which can be raised to an excited electronic energy state by the absorption of electromagnetic radiation in the form of ultraviolet or visible light and which, through either intramolecular or intermolecular attraction, can result in the formation of a reactive intermediate. The photoinitiator further initiates polymerization of the PETA to cause crosslinking therein.

In the prior art, many types of photoinitiators have been used to cure coating compositions which are applied to lenses. For example, the Oshima et al U.S. Pat. No. 3,968,305 includes the use of azobisisobutronitrile, benzoyl peroxide, lauroyl peroxide and benzoin and its alkyl ether, the alkyl group having at most 4 carbon atoms. Although such photoinitiators provide a mechanism for curing the coating composition using ultraviolet radiation, the ultraviolet radiation curing must be performed under an inert environment or various oxygen scavengers, such as nitrogen-containing compounds, must be used. However, these methods suffer in that the constituents used to minimize oxygen inhibition reduce the effective crosslinked density of the resulting cured film, resulting in a plasticized, weaker and less abrasion-resistant cured film surface. Furthermore, in order for the coating to adhere to the lens material, either the coating is not fully cured, providing functional groups at the interface between the coating and the lens material, such as is described in the Sandvig et al U.S. Pat. No. 4,544,572, or the photoinitiator is of a less efficient type, such as is described in the Oshima et al U.S. Pat. No. 3,968,305 or the Matsuo et al U.S. Pat. No. 3,968,309. However, the use of a less efficient photoinitiator has the disadvantage of providing a less abrasion resistant coating.

The present invention requires the use of highly efficient photoinitiators to cure the coating composition without regard to adherance of the coating composition to the lens material. Applicant has found that a suitable photoinitiator includes aroketones and aromatic-containing ketones. The preferred photoinitiator of the present invention is 1-hydroxy- cyclohexyl-phenyl ketone, which is employed at concentrations of 0.1–10.0% by weight of the resin solids and most preferably in the range of 2–5% by weight of the resin solids. The preferred photoinitiator is marketed under the designation of IRGACURE 184 by Ciba-Geigy.

The use of a more highly efficient photoinitiator system permits curing of the coating composition without regard to whether the curing takes place in an oxygen environment or in an inert environment.

The ultraviolet source used in the present invention is a commercially-available medium-pressure mercury lamp having its greatest output in the wavelength range of 240–270 nm. The wavelength range of 240–270 nm results in an efficient absorption of UV by the preferred photoinitiator of the present invention.

To prevent premature polymerization or gelling of the coating solution before UV exposure, a polymerization inhibitor is provided in the coating composition of the present invention. It has been found by the applicant that in addition to providing useful storage and working life to the coating solution, the inhibitor preserves a molecular layer of unreacted acrylate groups on the surface of the coating composition which interfaces with the lens forming material while still permitting UV cure in an oxygen environment to form a highly crosslinked film on the mold. It is believed that the acrylate groups of the coating composition form carbon-to-carbon covalent bonds adhering the coating composition to the lens although the coating composition is "fully cured."

Polymerization inhibitors useful in the present invention include compounds in the unsubstituted and substituted hydroquinone family. A preferred inhibitor is monoethyl ether hydroquinone (MEHQ). Approximately 100 to 2000 parts per million of MEHQ with preferably approximately 350 parts per million of MEHQ results in sufficient functional groups being left active in the interface between the coating and the lens material without affecting complete cure in the remaining portion of the coating and without affecting the abrasion resistance of the coating.

The following theory is proposed as an explanation, without the applicant being bound thereto, as to the mechanism of the formation of the coating composition and its adherance to the lens polymer. When the coating composition is subjected to ultraviolet radiation, the curing of the coating composition is stratified as a function of its distance within the thickness of the coating. Specifically, for any given point within the coating film, the ultraviolet dose will be inversely proportional to the square of the distance, with the highest dose being administered to the surface nearest the ultraviolet source, and the lowest dose received at the interface of the mold surface with intermediate doses in between. Sufficient UV dosage is applied to penetrate through the coating film and provides essentially complete cross-linking of the layer of coating at the coating/mold surface interface. However, the oxygen inhibitor saves a sufficiently large population of acrylate functional groups at the coating/lens polymer interface so that the covalent chemical bonds can be formed between the coating composition and the lens polymer. It is believed that this covalent bonding provides the strong adherance of the coating composition to the lens polymer.

After the coating has been cured, the lens forming material is introduced into the mold to form the ophthalmic lens. A suitable material is an acryl- or allyl-functional polymer, with the latter being a preferred embodiment for casting ophthalmic lenses (and more preferably allyl diglycol carbonate monomer or prepolymer, such as is commercially available as PPG Industries' CR-39 monomer). Methylmethacrylate is also a suitable lens-forming material. At the lens/coating interface, carbon-to-carbon covalent bonds are formed between the lens material and the layer of residual active acrylate groups of the coating material. The bonds that are formed provide secure adherance of the coating to the lens material.

After the lens polymer has hardened, the solid lens is removed from the mold with the coating strongly adhered to the lens material.

The following examples are for illustrative purposes only and are not to be considered as limiting the present invention. Unless otherwise noted, all references to parts are to parts by weight.

EXAMPLE 1

A liquid hardcoating general formulation was prepared consisting of:
  100 parts PETA (pentaerythritol tetraacrylate)
  3.5 parts photoinitiator (1-hydroxy cyclohexyl phenyl ketone)
  900 parts solvent (methylene chloride)

This formulation was flowcoated onto cleaned glass single and bifocal lens molds (with the reading segment ledge in a vertical orientation), then heat-dried to assure complete solvent removal. The coated molds were then cured under a conveyorized Fusion Systems' Super Six UV lamp (six-inch Hg bulb, rated 200 watts per inch). The coated molds traveled along the axis of the conveyor, which was perpendicular to the axis of the six-inch UV lamp employed, and the front plane of the coated molds was $2\frac{1}{2}$ inches from the front plane of the focused lamp reflector. Conveyor line speed was one inch per second. Total exposure would depend upon the number of passes given the particular mold, with each pass yielding about 1 Joule/cm$^2$ exposure dose. The molds and coating composition were exposed to four passes.

At this point, the coated molds were tested by rubbing with steel wool manually. Under light to medium pressure, only light scratches were evident; only under very heavy pressure were readily visible scratches noted. The coated molds were next spot-tested by wiping with MEK-saturated tissues vigorously; if the coating was not tightly crosslinked, the coating would haze or lose its glossy surface appearance. All molds receiving two or more passes under the UV source passed both steel wool and solvent resistance tests.

The coated molds were then assembled with uncoated mates to produce semi-finished bifocal lenses. The coated front mold plus a flexible gasket were filled with conventional peroxide-containing CR-39 syrup manually. Then the uncoated top mold was pushed into place, pushing out any air and excess CR-39 syrup. A steel spring clip was used to hold the two molds tightly in place. The filled moldset could then be cured conventionally by circulating air ovens or by heated waterbath autoclaves. Using the latter method, cure took place over a period of progressive temperature increases up to a peak plateau temperature of 120° F. Total cycle time was 21 hours, after which the assemblies were broken open and the lenses demolded and allowed to cool before testing.

Adhesion testing was performed using a crosshatch-tape-pull method (ASTM-D-3359-1978). Tests were run after demolded lenses cooled to room temperature, and again after 30-minute immersion in boiling water (to simulate laboratory lens coloring with heated dye bath); perfect adhesion (ASTM rating of 5) was obtained.

Abrasion resistance was also tested using ASTM-F-735-1981 "oscillating sand abrader" test equipment and method. A typical uncoated CR-39 lens received a 7 or 8 test value on this method, with the highest ever commercially-available coated CR-39 lens receiving average values of 33–34. Most factory-coated CR-39 lenses from the world class lens manufacturers average between 15 and 25 on this test. The coatings of the present invention were generally superior to any of the rest and only slightly behind the best ever, with average values of 28–30.

The coated lenses also passed wet and dry heat thermal tests, and thermal shock tests without delamination or loss of adhesion.

The wet heat thermal test includes placing the coated lens in the holder and into water between 94° C. and 100° C. The coated lens is removed and checked for defects, such as delamination, during the following intervals: 1 minute, 2 minutes, 3 minutes, 5 minutes, 10 minutes, 15 minutes, 20 minutes, 30 minutes and 1 hour.

Using the dry thermal test, the coated lens is placed in a convection oven which has been preheated to 100° C. the coated lens was checked for defects at one hour intervals until failure or 8 hours, whichever comes first. The coated lens is given a pass rating if there is no visible degradation of the coating.

The coated surfaces were also tested for short-term solvent resistance using acetone, MEK, isopropyl alcohol, ethanol and glycerol. Solvent resistance was tested by vigorously wiping the coated lens with a saturated lens wiper with each of the immediately above-mentioned solvents to determine if there are any detrimental effects to the coating. The solvents were applied at room temperature with no apparent effects on the coating.

EXAMPLE 2

In this test series, different photoinitiators were evaluated in an otherwise constant coating formulation consisting of 100 parts PETA, 3.5 parts photoinitiator and 900 parts methylene chloride solvent. Each experimental formulation was flowcoated onto glass bifocal molds, dried, then UV cured as described in Example 1. At this point, differing degrees of cure were observed when steel wool was rubbed over the coated mold's surface using the photoinitiators set forth below:

1-hydroxy cyclohexyl phenyl ketone . . . Excellent
2,2 dimethoxy 2-phenyl acetophenone . . . Good
eutectic 1:1 blend of 1. and benzophenone . . . Poor--Fair The coated molds were assembled, filled, and cured per Example 1, and the demolded lenses were again tested with steel wool rubs. The order of rank was unchanged.

EXAMPLE 3

The same formulation as Example 2 was run except pentaerithritol tetramethacrylate was substituted for PETA. The coated molds were found to be very soft to even light touches of steel wool after the ordinary 2- or 4-pass UV-cure exposures; even after 8 passes, the coating films were easily scratched.

Nevertheless, coated molds were filled, cast, and cured as described in Example 1 to see if sufficient further crosslinking would take place during CR-39-peroxide-initiated polymerization of the lens-curing cycle. The demolded lenses were of a good appearance but very soft and easily scratched with steel wool. Further UV post-cure exposure (2 minutes stationary exposure under 5.25 inch distance) gave no significant improvement.

EXAMPLE 4

3 PHR benzoyl peroxide was added to the coating composition of Example 1. Molds were coated, cast, and cured as in Example 1. No hardness difference was observed with the peroxide-containing formulation versus no peroxide.

Although the present invention has been described with reference to preferred embodiments, workers skilled in the art will recognize that changes may be made in form and detail without departing from the spirit and scope of the invention.

What is claimed is:

1. A process for producing a coated ophthalmic lens, the process comprising:
   applying a coating composition to the face of a mold, the coating composition including substantially only polymeric reactants having at least triacrylate functionality, a photoinitiator and a polymerization inhibitor reactive with oxygen and in an amount insufficient to affect substantial curing of the coating composition and in an amount insufficient to substantially affect abrasion resistance of the coating;
   subjecting the coating to ultra-violet radiation in oxygen environment such that the reactants are substantially polymerized so that the coating is in a hard abrasion resistant state with sufficient acrylate functionality at a lens/coating interface for further reaction;
   filling the lens mold with a lens-forming material;
   permitting the lens-forming material to harden and react with the acrylate groups at the lens/coating interface; and
   removing the hardened lens with coating from the mold.

2. The process of claim 1 wherein the reactants are reactants for forming pentaerythritol tetracrylate.

3. The process of claim 1 wherein the photoinitiator is selected from the group consisting of aroketones and aromatic-containing ketones.

4. The process of claim 3 wherein the photoinitiator includes 1-hydroxy-cyclohexyl-phenyl ketone.

5. The process of claim 4 wherein the concentration of 1-hydroxy-cyclohexyl-phenyl ketone is in the approximate range of 0.1% to 10% by weight of the polymeric reactants.

6. The process of claim 5 wherein the concentration of 1-hydroxy-cyclohexyl-phenyl ketone is in the approximate range of 2% to 5% by weight of the polymeric reactants.

7. The process of claim 1 wherein the polymerization inhibitor is monoethyl ether hydroquinone.

8. The process of claim 7 wherein the concentration of monoethyletherhydroquinone is in the approximate range of 100 to 2000 parts per million by weight of the polymeric reactants.

9. The process of claim 8 wherein the concentration of methylethylhydroquinone is approximately 350 parts per million by weight of the polymeric reactants.

10. The process of claim 1 wherein the coating composition further includes methylene chloride solvent.

11. The process of claim 1 wherein the reactants having triacrylate functionality have a molecular weight of less than 2000.

12. The process of claim 11 wherein the reactants having triacrylate functionality have a molecular weight of less than 600.

13. The process of claim 1 wherein the lens-forming material is selected from the group consisting of monomer or prepolymer for forming methylmethacrylate, allyldiglycol carbonate and blends thereof.

14. A process for producing a coated ophthalmic lens, the process comprising:
   applying a coating composition in a solvent to the face of a mold, the coating composition including monomeric or polymeric reactants having at least triacrylate functionality, a photoinitiator and a polymerization inhibitor reactive with oxygen and in an amount insufficient to affect substantial curing of the coating composition and in an amount insufficient to substantially affect abrasion resistance of the coating;
   subjecting the coating prior to filling the mold with lens-forming material to ultraviolet radiation of at least approximately 1 Joule/cm 2 in oxygen environment such that the reactants are polymerized so that the coating is in a hard abrasion resistant state with sufficient acrylate functionality at a lens/coating interface for further reaction;
   filling the lens mold with a lens-forming material;
   permitting the lens-forming material to harden and react with the acrylate groups at the lens/coating interface; and
   removing the hardened lens with coating from the mold.

15. The process of claim 14 wherein the reactants are reactants for forming pentaerythritol tetracrylate.

16. The process of claim 14 wherein the photoinitiator is selected from the group consisting of aroketones and aromatic-containing ketones.

17. The process of claim 14 wherein the photoinitiator includes 1-hydroxy-cyclohexyl-phenyl ketone.

18. The process of claim 17 wherein the concentration of 1-hydroxy-cyclohexyl-phenyl ketone is in the approximate range of 0.1D to 10% by weight of the polymeric reactants.

19. The process of claim 18 wherein the concentration of 1-hydroxy-cyclohexyl-phenyl ketone is in the approximate range of 2% to 5% by weight of the polymeric reactants.

20. The process of claim 14 wherein the polymerization inhibitor is monoethyl ether hydroquinone.

21. The process of claim 20 wherein the concentration of monoethyletherhydroquinone is in the approximate range of 100 to 2000 parts per million by weight of the polymeric reactants.

22. The process of claim 21 wherein the concentration of methylethylhydroquinone is approximately 350 parts per million by weight of the polymeric reactants.

23. The process of claim 14 wherein the coating composition further includes methylene chloride solvent.

24. The process of claim 14 wherein the reactants having triacrylate functionality have a molecular weight of less than 2000.

25. The process of claim 24 wherein the reactants having triacrylate functionality have a molecular weight of less than 600.

26. The process of claim 14 wherein the lens-forming material is selected from the group consisting of monomer or prepolymer for forming methylmethacrylate, allyldiglycol carbonate and blends thereof.

* * * * *